US009632834B2

(12) United States Patent
Kini et al.

(10) Patent No.: US 9,632,834 B2
(45) Date of Patent: Apr. 25, 2017

(54) ASSIGNING PRIORITIES TO COMPUTATIONAL WORK STREAMS BY MAPPING DESIRED EXECUTION PRIORITIES TO DEVICE PRIORITIES

(71) Applicant: NVIDIA CORPORATION, Santa Clara, CA (US)

(72) Inventors: Vivek Kini, Sunnyvale, CA (US); Forrest Iandola, Berkeley, CA (US); Timothy James Murray, San Francisco, CA (US)

(73) Assignee: NVIDIA Corporation, Santa Clara, CA (US)

( * ) Notice: Subject to any disclaimer, the term of this patent is extended or adjusted under 35 U.S.C. 154(b) by 736 days.

(21) Appl. No.: 13/897,291

(22) Filed: May 17, 2013

(65) Prior Publication Data

US 2014/0344822 A1 Nov. 20, 2014

(51) Int. Cl.
*G06F 9/50* (2006.01)
*G06F 9/48* (2006.01)
*G06F 9/38* (2006.01)
*G06F 9/30* (2006.01)

(52) U.S. Cl.
CPC .......... *G06F 9/5038* (2013.01); *G06F 9/3851* (2013.01); *G06F 9/4881* (2013.01); *G06F 9/30* (2013.01); *G06F 2209/5021* (2013.01)

(58) Field of Classification Search
CPC .... G06F 9/5038; G06F 9/3851; G06F 9/4881; G06F 2209/5021; G06F 9/30
See application file for complete search history.

(56) References Cited

U.S. PATENT DOCUMENTS

| 8,056,093 | B1 * | 11/2011 | McClure | G06T 1/20 |
| | | | | 345/522 |
| 8,139,069 | B1 * | 3/2012 | Molnar | G06T 15/005 |
| | | | | 345/505 |
| 2005/0114460 | A1 * | 5/2005 | Chen | G06F 9/5038 |
| | | | | 709/207 |
| 2007/0294696 | A1 * | 12/2007 | Papakipos | G06F 9/5027 |
| | | | | 718/102 |
| 2011/0050713 | A1 * | 3/2011 | McCrary | G06F 9/3851 |
| | | | | 345/522 |
| 2012/0017069 | A1 * | 1/2012 | Bourd et al. | 712/216 |

(Continued)

*Primary Examiner* — Benjamin Wu
(74) *Attorney, Agent, or Firm* — Artegis Law Group, LLP

(57) ABSTRACT

One embodiment sets forth a method for assigning priorities to kernels launched by a software application and executed within a stream of work on a parallel processing subsystem. First, the software application assigns a desired priority to a stream using a call included in the API. The API receives this call and passes it to a driver. The driver maps the desired priority to an appropriate device priority associated with the parallel processing subsystem. Subsequently, if the software application launches a particular kernel within the stream, then the driver assigns the device priority associated with the stream to the kernel before adding the kernel to the stream for execution on the parallel processing subsystem. Advantageously, by assigning priorities to streams and, subsequently, strategically launching kernels within the prioritized streams, an application developer may fine-tune the software application to increase the overall processing efficiency of the software application.

20 Claims, 7 Drawing Sheets

(56) References Cited

U.S. PATENT DOCUMENTS

| | | | | |
|---|---|---|---|---|
| 2013/0155080 A1* | 6/2013 | Nordlund | ............. | G06T 15/005 345/522 |
| 2013/0166766 A1* | 6/2013 | Nahrstedt | ......... | H04L 29/06027 709/231 |
| 2013/0305258 A1* | 11/2013 | Durant | ................. | G06F 9/4881 718/106 |
| 2014/0022266 A1* | 1/2014 | Metz | ........................ | G06T 1/20 345/522 |
| 2014/0344826 A1* | 11/2014 | Wu | ...................... | G06F 9/4881 718/104 |

* cited by examiner

ASSIGNING PRIORITIES TO COMPUTATIONAL WORK STREAMS BY MAPPING DESIRED EXECUTION PRIORITIES TO DEVICE PRIORITIES

BACKGROUND OF THE INVENTION

Field of the Invention

The present invention generally relates to general purpose computing and, more specifically, to techniques for assigning priorities to streams of work.

Description of the Related Art

A typical parallel processing subsystem, that may include one or more graphics processing units (GPUs), is capable of very high performance using a relatively large number of small, parallel execution threads on dedicated programmable hardware processing units. The specialized design of such parallel processing subsystems usually allows these subsystems to efficiently perform certain tasks, such as rendering 3-D scenes or computing the product of two matrices, using a high volume of concurrent computational and memory operations To fully realize the processing capabilities of advanced parallel processing subsystems, subsystem functionality may be exposed to application developers through one or more application programming interfaces (APIs) of calls and libraries. Among other things, doing so enables application developers to tailor their software application to optimize the way parallel processing subsystems function. In one approach to developing a software application, the software application developer may implement an algorithm by dividing the work included in the algorithm into streams of work components (e.g., computational and memory operations) that may be executed in parallel on the parallel processing subsystem. Within each stream, a sequence of work components executes in issue-order on the parallel processing subsystem. In contrast, work components included in different streams may run concurrently and may be interleaved.

In one approach to scheduling work components, a scheduler within the parallel processing subsystem allocates parallel processing subsystem resources in discrete time slices to work components included in concurrent streams. When allocating a particular parallel processing subsystem resource, the scheduler typically selects the appropriate work component in issue-order. In other words, the scheduler selects the work component that was issued least recently from the set of work components that may be successfully performed using the resource. Further, if more than one appropriate parallel processing subsystem is available, the scheduler typically executes the work component using the appropriate parallel processing subsystem resource that has been least recently used.

One drawback to this approach is that some work components are more sensitive to latency than others. And the execution of work components in strict issue-order on the least recently used parallel processing subsystem resources may cause software applications that include latency-sensitive work components to execute with unacceptable latency and throughput. For example, if a software application is performing video decoding and encoding using a pipelined workflow and the first few stages in the pipeline are occupying most of the parallel processing subsystem resources processing a fifth frame, then the processing of a fourth frame by the last stage in the pipeline could be delayed. Consequently, the overall latency of the fourth frame could cause jitter in frame rates.

Another drawback to the above approach is that some software applications may be sensitive to execution order because they include inter-stream dependencies between work components requiring varying execution times. For example, a software application performing high-performance simulation of large molecular systems (e.g., NAMD) may use parallel molecular dynamics algorithms that include work components whose required execution times vary dramatically. Often, such algorithms divide the work into multiple streams with inter-dependencies. For example, a first stream could include "halo" work components whose results are required by "dependent" work components included a second stream. And the first stream could also include "internal" work components whose results are not required by work components included in any other stream. Further, the "halo" work components could require much shorter execution times than the "internal" work components. If the "internal" work components occupy most of the subsystem resources, then the "halo" work components could get stalled (i.e., blocked until any "internal" work components preceding the "halo" components complete). Because "dependent" work components included in the second stream require the results from "halo" work components included in the first stream, the second stream could be blocked until the blocking "internal" work components included in the first stream complete execution. Consequently, overall throughput of the software application could be adversely impacted.

As the foregoing illustrates, what is needed in the art is a more effective technique to schedule work submitted to parallel processing subsystems.

SUMMARY OF THE INVENTION

One embodiment of the present invention sets forth a method for prioritizing computational work components included in a software application for execution within a parallel processing subsystem. The method includes receiving a current request from the software application to launch a computational work component within a stream, identifying a device priority associated with the stream, and submitting the computation work component to the parallel processing subsystem for execution within the stream at the device priority.

Other embodiments of the present invention include, without limitation, a computer-readable storage medium including instructions that, when executed by a processing unit, cause the processing unit to implement aspects of the techniques described herein as well as a system that includes different elements configured to implement aspects of the techniques described herein.

By implementing the disclosed techniques, together the API and the driver enable application developers to tailor their software applications to leverage advanced prioritization functionality included in parallel processing subsystems. By exploiting the prioritization functionality, the performance of the software applications may be improved by decreasing latency and increasing throughput.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only

DETAILED DESCRIPTION

In the following description, numerous specific details are set forth to provide a more thorough understanding of the present invention. However, it will be apparent to one of skill in the art that the present invention may be practiced without one or more of these specific details.

Figure 1:
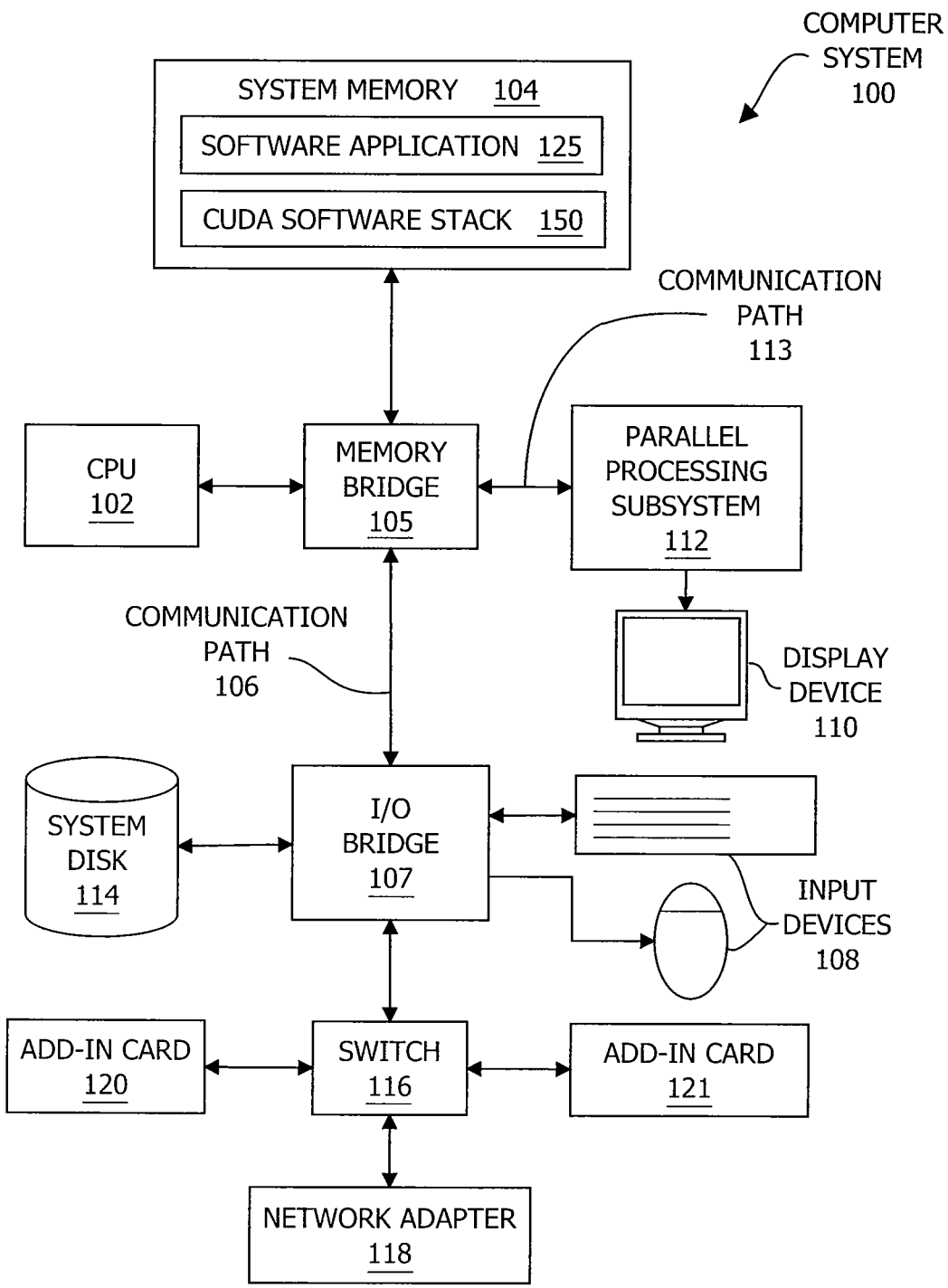
FIG. 1 is a block diagram illustrating a computer system configured to implement one or more aspects of the present invention.

FIG. 1 is a block diagram illustrating a computer system 100 configured to implement one or more aspects of the present invention. As shown, the computer system 100 includes, without limitation, a central processing unit (CPU) 102 and a system memory 104 communicating via an interconnection path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via communication path 106 and memory bridge 105. A parallel processing subsystem 112 is coupled to memory bridge 105 via a bus or second communication path 113 (e.g., a Peripheral Component Interconnect (PCI) Express, Accelerated Graphics Port, or HyperTransport link); in one embodiment parallel processing subsystem 112 is a graphics subsystem that delivers pixels to a display device 110 (e.g., a conventional cathode ray tube or liquid crystal display based monitor). A system disk 114 is also connected to I/O bridge 107. A switch 116 provides connections between I/O bridge 107 and other components such as a network adapter 118 and various add-in cards 120 and 121. Other components (not explicitly shown), including universal serial bus (USB) or other port connections, compact disc (CD) drives, digital video disc (DVD) drives, film recording devices, and the like, may also be connected to I/O bridge 107. The various communication paths shown in FIG. 1, including the specifically named communication paths 106 and 113, may be implemented using any suitable protocols, such as PCI Express, AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements in a single subsystem, such as joining the memory bridge 105, CPU 102, and I/O bridge 107 to form a system on chip (SoC).

In operation, the CPU 102 is the master processor of the computer system 100, controlling and coordinating operations of other system components. In particular, the CPU 102 issues commands that control the operation of the parallel processing subsystem 112. Those commands may originate within a software application 125 resident in the system memory 104 and executing on the CPU 102. A compute unified device architecture (CUDA) software stack 150 is also resident in the system memory 104. CUDA is a general-purpose computing environment which uses the parallel processing subsystem 112 to perform various computing tasks. The CUDA software stack 150 is a set of programs included in the CUDA that issue and manage general-purpose computations that operate on components in the parallel processing subsystem 112. The software application 125 may generate requests (i.e., calls) for processing by the CUDA software stack 150 to produce a desired set of results. In alternate embodiments, the CUDA software stack may be replaced with any set of software programs that expose and manage parallel processing subsystem functionality. For example, the CUDA software stack may be replaced with a different general-purpose compute software stack or a graphics software stack. Further, the CUDA software stack may be configured to inter-operate with one or more additional software stacks.

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip instead of existing as one or more discrete devices. Large embodiments may include two or more CPUs 102 and two or more parallel processing subsystems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
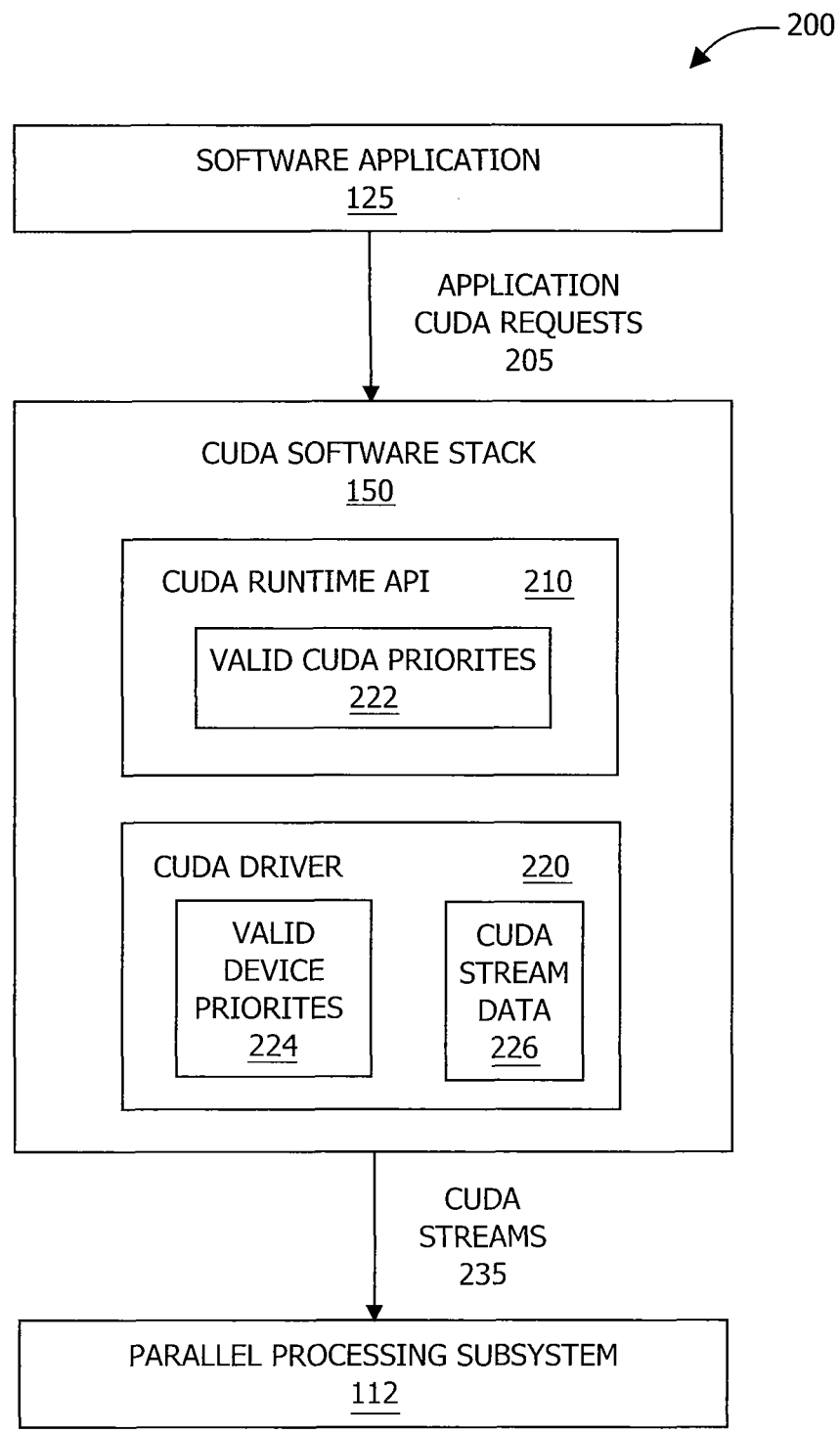
FIG. 2 is a conceptual diagram illustrating the processing of application CUDA requests within the computer system of FIG. 1, according to one embodiment of the present invention.

FIG. 2 is a conceptual diagram illustrating the processing of application CUDA requests 205 within the computer system 100 of FIG. 1, according to one embodiment of the present invention. As shown, the subsystem 200 includes, without limitation, the software application 125, the CUDA software stack 150, and the parallel processing subsystem 112 of FIG. 1.

To efficiently achieve a set of results using the parallel processing subsystem 112, the software application 125 may pass application CUDA requests 205 to the CUDA software stack 150. As shown, the CUDA software stack 150 includes a CUDA runtime application programming interface (API) 210 and a CUDA driver 220. The CUDA runtime API 210 includes calls and libraries that expose the functionality of the parallel processing subsystem 112 to application developers. And the CUDA driver 220 is configured to translate the application CUDA requests 205 received by the CUDA runtime API 210 to lower-level commands that execute on components within the parallel processing subsystem 112. In particular, the CUDA driver 220 may submit one or more CUDA streams 235 to the parallel processing subsystem 112 for execution within the parallel processing subsystem 112. Each CUDA stream 235 may include any number, including zero, of kernels (i.e., functions) interleaved with any number, including zero, of other work components, such as memory operations. Each kernel has a defined entrance and exit and, typically, performs a computation on each element of an input list. Within each CUDA stream 235, the kernels execute in issue-order on the parallel processing subsystem 112. However kernels included in different CUDA streams 235 may run concurrently and may be interleaved.

As noted previously herein, parallel processing subsystems are typically configured to allocate discrete time slices of parallel processing subsystem resources to streams using a particular scheduling technique. Again, the prior-art scheduling technique used by many parallel processing subsystems is to assign the next time slice of the least recently used appropriate resource to the stream in which the least recently issued, un-executed work component was issued first. In other words, these parallel processing subsystems execute work components in a strict issue-order on the least recently used appropriate parallel processing subsystem resource. For example, suppose that a kernel "KA" were the least recently issued, un-executed work component included in stream "A" and kernel "KB" were the least recently issued, un-executed work component included in stream "B." Further, suppose that the kernel "KB" were to have been issued before the kernel "KA." A prior-art parallel processing subsystem would typically allocate the least recently used appropriate parallel processing subsystem resource to execute stream "B" work components before allocating any similar parallel processing subsystem resource to execute stream "A" work components.

In contrast, parallel processing subsystem 112 includes advanced prioritization functionality that enables more flexible scheduling. More specifically, parallel processing subsystem 112 includes functionality that enables prioritization of kernels and preemption of currently executing kernels. Thus, the parallel processing subsystem 112 may schedule kernels in priority-order (as opposed to strict issue-order). And the parallel processing subsystem 112 may preempt a lower-priority kernel executing on a parallel processing subsystem 112 resource in favor of one or more higher-priority kernels (as opposed to using the resource used least recently). For example, the parallel processing subsystem 112 may receive a high priority kernel "KHIGH," interrupt a low priority kernel "KLOW" executing on a parallel processing subsystem 112 resource, execute the high priority kernel "KHIGH" on the resource, and then resume executing the lower priority kernel "KLOW" on the resource.

Advantageously, to facilitate the development of software applications 125 that efficiently utilize the advanced prioritization capabilities of the parallel processing subsystem 112, the CUDA software stack 150 is configured to support the available prioritization functionality of the parallel processing subsystem 112. More specifically, the CUDA runtime API 210 exposes prioritization functionality by including a set of valid CUDA priorities 222 and by supporting application CUDA requests 205 that enable the software application 125 to request a specific desired CUDA priority to be associated with a specific CUDA stream 235. And the CUDA driver 220 is configured to receive application CUDA requests 205 from the CUDA runtime API 210, process prioritization information included in the application CUDA requests 205, and launch each kernel included in a specific CUDA stream 235 with the priority associated with the specific CUDA stream 235

As shown, to facilitate the process described above, the CUDA driver 220 includes valid device priorities 224 and CUDA stream data 226. The valid device priorities 224 represent priorities defined and supported by the parallel processing subsystem 112. The CUDA driver 220 may store data associated with CUDA streams 235 as CUDA stream data 226 included in any available memory resource, such as the system memory 104. Upon receiving a particular application CUDA request 205 to associate a desired CUDA priority with a particular CUDA stream 235, the CUDA driver 220 maps the desired CUDA priority to a stream-specific device priority. As part of the mapping process, the CUDA driver 220 analyzes the valid CUDA priorities 222 in conjunction with the valid device priorities 224. The CUDA driver 220 then stores the stream-specific device priority along with stream-specific identifying information, such as a stream name or a stream ID, as CUDA stream data 226.

Upon receiving a particular application CUDA request 205 to launch a particular kernel within a particular CUDA stream 235, the CUDA driver 220 is configured to access the CUDA stream data 226 to determine whether the CUDA stream 235 is associated with a device priority. If the CUDA stream 235 is associated with a device priority, then the CUDA driver 220 includes the device priority when submitting the kernel to the parallel processing system 112 for launch within the CUDA stream 235. If the CUDA stream 235 is not associated with a device priority, then the CUDA driver 220 may include a default device priority when submitting the kernel to the parallel processing system 112 for launch within the CUDA stream 235. Alternatively, in some embodiments, the CUDA driver 220 may submit the kernel to the parallel processing system 112 without including any device priority.

The valid CUDA priorities 222 represent any number, including zero, of priorities that the application developer may use in the software application 125 to fine-tune the performance of the software application 125. Further, the valid CUDA priorities 222 may use higher numbers to represent higher priorities or lower numbers to represent higher priorities, and may specify any number as a default priority. For example, if the CUDA priorities 222 included three numbers with (−1) representing a high priority, 0 representing both a medium and a default priority, and 1 representing a low priority, then the application developer could incorporate three levels of priority into the software application 125. Similarly, the valid device priorities 224 may include any number, including zero, of priorities that are supported by the parallel processing subsystem 112. The valid device priorities 224 may use higher numbers to represent higher priorities or lower numbers to represent higher priorities, and may specify any number as a default priority. For example, the valid device priorities 224 could include sixty-four numbers with (−63) representing the highest priority and (0) representing the lowest priority.

Again, to meaningfully convey the CUDA priorities included in the application CUDA requests 205 to the parallel processing subsystem 112, the CUDA driver 220 is configured to map valid CUDA priorities 222 included in the application CUDA requests 205 to corresponding valid device priorities 224. More specifically, the CUDA driver 220 uses the valid CUDA priorities 222 and the valid device priorities 224 to determine a corresponding device priority for each requested CUDA priority. The CUDA driver 220 may be configured to execute any technically feasible mapping algorithm. For example, suppose that the valid CUDA priorities 222 were to include 5 to represent a high CUDA priority, 6 to represent a medium CUDA priority, and 7 to represent a low CUDA priority. Further, suppose that the valid device priorities 224 were to include 20 to represent the highest device priority through 1 to represent the lowest device priority. The CUDA driver 220 could be configured to map CUDA priority 5 to device priority 5, CUDA priority 6 to device priority 4, and CUDA priority 7 to device priority 3. Alternatively, the CUDA driver could be configured to map CUDA priority 5 to device priority 15, CUDA priority 0 to device priority 10, and CUDA priority 1 to device priority 5.

As part of the mapping algorithm, the CUDA driver 220 may be configured to reserve any number of valid device priorities 224 to support other functionality included in the parallel processing subsystem 112. For example, CUDA dynamic parallelism allows one kernel to launch another kernel on the parallel processing subsystem 112 without the involvement of the CPU 102. As persons skilled in the art will understand, CUDA dynamic parallelism may be implemented using device priorities. More specifically, device priorities may be used to ensure that a parent keArnel relinquishes enough parallel processing subsystem 112 resources to allow the child kernel to execute on the parallel processing subsystem 112. For example, support for CUDA dynamic parallelism may include assigning a child kernel a priority level higher than the default dynamic parallelism priority level that is assigned to the parent kernel. Consequently, the CUDA driver 220 may be configured to reserve one or more valid device priorities 224 for child kernels and exclude those reserved device priorities when mapping a requested CUDA priority to a corresponding device priority. Further, the CUDA runtime API 210 may be configured to include a limited set of valid CUDA priorities 222 to reflect the reserved valid device priorities 224 or expected use-cases.

Advantageously, the CUDA software stack 150 is configured to support a variety of parallel processing subsystems 112 in combination with a variety of software applications 125. More specifically, the CUDA software stack 150 supports parallel processing subsystems 112 that that provide various levels, including none, of support for prioritization. And the CUDA software stack 150 supports software applications 125 that request CUDA priorities 222 to be associated with any number, including none, of CUDA streams 235. For example, if an alternate embodiment included a parallel processing subsystem that provided no support for prioritization, then the CUDA driver 220 would not include device priorities when including kernels in CUDA streams 235. And, if another alternate embodiment included a software application that did not specify any CUDA priorities, then the CUDA driver 220 could be configured to include a default device priority when including kernels in CUDA streams 235.

Using the techniques disclosed herein, the CUDA stack 150 enables the software developers to strategically use prioritization to reduce latency and increase throughput of the software application 125, thereby increasing the speed at which the software application 125 executes on the parallel processing subsystem 112. For example, in one embodiment, the software application 125 could implement a video decoding and encoding algorithm using a three stage pipelined workflow. And, if the application developer wanted to reduce the possibility of jitter caused by latency, then the application developer could strategically assign priorities to kernels.

More specifically, the application developer could specify a low priority CUDA stream 235, a medium priority CUDA stream 235, and a high priority CUDA stream 235. Subsequently, the application developer could specify the launch of kernels associated with the first stage within the low priority CUDA stream 235. Further, the application developer could specify the launch of kernels associated with the second stage within the medium priority CUDA stream 235. And the application developer could specify the launch of kernels associated with the third stage within the high priority CUDA stream 235. As persons skilled in the art will understand, this prioritization in conjunction with the processing performed by the CUDA stack 150, would direct a parallel processing subsystem 112 that is capable of prioritizing kernels to prioritize the third stage in the pipeline before the second stage, and the second stage before the first stage. This prioritization would ensure that a particular frame is not starved for processing resources by subsequent frames. Consequently, the overall latency of each frame could be decreased compared to prior-art scheduling approaches and could, therefore, be less likely to cause jitter in frame rates.

Figure 3:
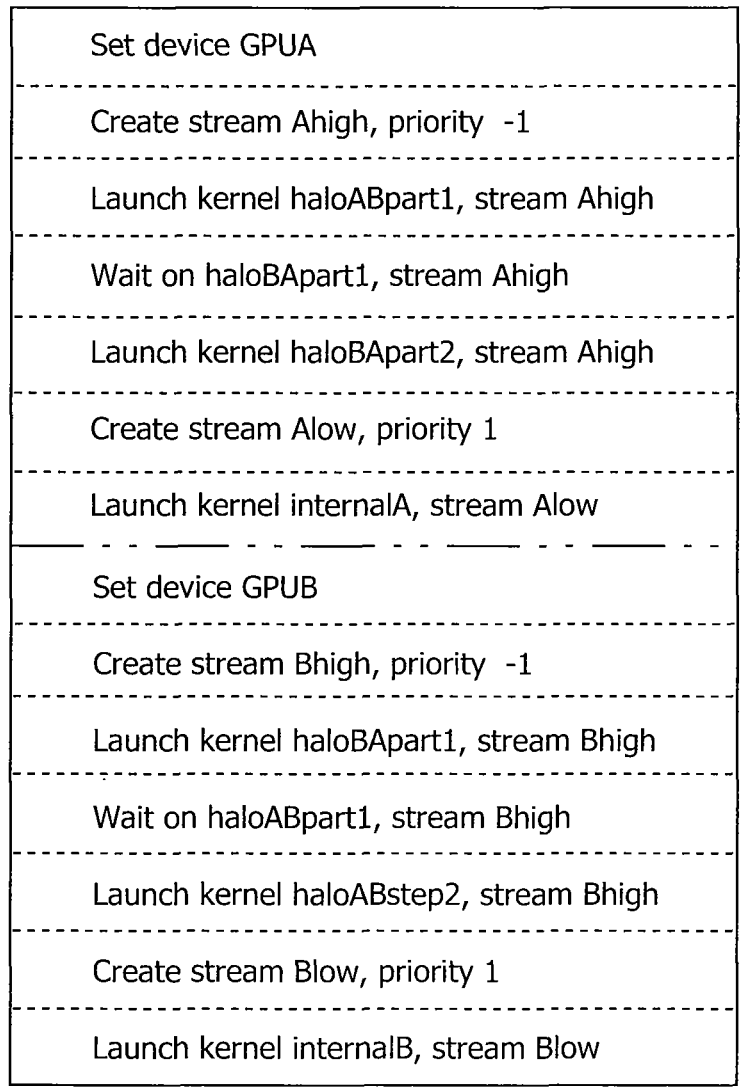
FIG. 3 is a conceptual diagram illustrating exemplary application CUDA requests of FIG. 2, according to one embodiment of the present invention.

FIG. 3 is a conceptual diagram illustrating exemplary application CUDA requests 205 of FIG. 2, according to one embodiment of the present invention. As shown, each row represents a single application CUDA request 205. As also shown, the rows are organized sequentially in an issue order 310. In other words, the software application 125 passes the exemplary application CUDA requests 205 to the CUDA runtime API 210 in the issue order 310 shown in FIG. 3.

In the example shown in FIG. 3, the computer system 100 includes two parallel processing subsystems 112 (not shown), "GPUA" and "GPUB," both of which include functionality that enable prioritization of kernels and preemption of currently executing kernels. And the valid CUDA priorities 222 include three numbers with (−1) representing a high priority; 0 representing a medium and default priority, and 1 representing a low priority. The CUDA requests 205 are issued by the software application 125 as part of a simulation of large molecular systems (e.g., NAMD). The software application 125 has divided the work to be executed on the parallel processing subsystems 112 into six separate kernels based on the required execution time for each of the kernels and any interactions between the kernels.

More specifically, the software application 125 has divided the work into two "internal" kernels ("internalA" and "internalB") and four "halo" kernels ("haloABpart1," "haloABpart2," "haloBApart1," and "haloBApart2"). Each of the "internal" kernels requires a much longer execution time than any of the "halo" kernels. Further, each of the "internal" kernels has no dependencies on any other kernel. In contrast, each of the "halo" kernels has a dependency (i.e., either the "halo" kernel requires results from another "halo" kernel or the results from the "halo" kernel are required by another "halo" kernel) on one of the other "halo" kernels. More specifically, "haloABpart2" requires results from "halo ABpart1" and, therefore "haloABpart1" must complete execution before "haloABpart2" begins executing. Similarly, "haloBApart2" requires results from "halo BApart1" and, therefore "haloBApart1" must complete execution before "haloBApart2" begins executing. Further, other algorithms (not detailed herein) included in the software application 125 require the results from both the "haloABpart2" and the "haloBApart2" kernels.

As the application CUDA requests 205 illustrate, the software application 125 has taken advantage of both available parallel processing subsystems 112 (i.e., "GPUA" and "GPUB") as well as two (i.e., high (−1) and low (1)) of the three valid CUDA priorities 222. More specifically, based on the execution length and dependencies between the kernels, the software application 125 has strategically assigned each of the six kernels to one of four CUDA streams 235. "Ahigh" is a high priority CUDA stream 235 to be executed on "GPUA." "Alow" is a low priority CUDA stream 235 to be executed on "GPUA." "Bhigh" is a high priority CUDA stream 235 to be executed on "GPUB." And "Blow" is a low priority CUDA stream 235 to be executed on "GPUB."

The first application CUDA request 205 "set device GPUA," informs the CUDA software stack 150 that components within the parallel processing subsystem 112 "GPUA" are to be used to execute application CUDA requests 205 until a new "set device" application CUDA request 205 is received.

The second application CUDA request 205 "create stream Ahigh, priority −1," directs the CUDA driver 220 to create a new CUDA steam 235 "Ahigh" for execution within the parallel processing subsystem 112 "GPUA." The second application CUDA request 205 also directs the CUDA driver 220 to, subsequently, launch kernels within the CUDA stream 235 "Ahigh" with a device priority corresponding to CUDA priority "−1." As previously disclosed herein, to determine the corresponding device priority the CUDA driver 220 maps the CUDA priority "−1" to a corresponding device priority included in the valid device priorities 224. In the example shown in FIG. 3, the valid device priorities 224 include 64 numbers, with 0 representing the highest priority and 63 representing the lowest priority. Further, the CUDA driver 220 in this example is configured to map CUDA priority "−1" to device priority "59" and CUDA priority "1" to device priority "63." Consequently, the CUDA driver 220 associates the CUDA stream 235 "Ahigh" with device priority "59" and stores this association in the CUDA stream data 226.

The third application CUDA request 205 "launch kernel haloABpart1, stream Ahigh," requests that kernel "haloABpart1" be launched within CUDA stream 235 "Ahigh". As previously disclosed in conjunction with FIG. 2, before including the kernel "haloABpart1" in the CUDA stream 235 "Ahigh," the CUDA driver 220 accesses the CUDA stream data 226 to determine whether the CUDA stream 235 "Ahigh" is associated with a device priority. Because the CUDA stream data 226 includes the association of CUDA stream 235 "Ahigh" with the device priority "59," the CUDA driver 220 adds the kernel "haloABpart1" together with the device priority "59" to the CUDA stream 235 "Ahigh."

The fourth application CUDA request 205 "wait on haloBApart1, stream Ahigh," causes the CUDA driver 220 to add one or more corresponding synchronizing operations to the CUDA stream 235 "Ahigh." These operations instruct the parallel processing subsystem 112 "GPUA" to wait until "haloBApart1" has completed execution before executing the remaining work components (including launching kernels) included in CUDA stream 235 "Ahigh." The fifth application CUDA request 205, "launch kernel haloBApart2, stream Ahigh," requests that kernel "haloBApart2" be launched within CUDA stream 235 "Ahigh". This request causes the CUDA driver 220 to add the kernel "haloBApart2" together with the device priority "59" to the CUDA stream "Ahigh." Together, the fourth and fifth application CUDA requests 205 ensure that the results from kernel "haloBApart1" are available before kernel "haloBApart2" is executed.

The sixth application CUDA request 205 "create stream Alow, priority 1," causes the CUDA driver 220 to create a new CUDA steam 235 "Alow" for execution within the parallel processing subsystem 112 "GPUA." The sixth application CUDA request 205 also directs the CUDA driver 220 to, subsequently, launch kernels within the CUDA stream 235 "Alow" with a device priority "63." And the seventh application CUDA request 205 "launch kernel internalA, stream Alow," causes the CUDA driver 220 to add the kernel "internalA" together with the device priority "63" to the CUDA stream "Alow."

In a similar fashion, the next seven application CUDA requests 205 create two prioritized CUDA streams 235 (a high priority CUDA stream 235 "Bhigh" and a low priority CUDA stream 235 "Blow") for execution by components included in the parallel processing system 112 "GPUB." The CUDA stream 235 "Bhigh" includes three sets of one or more commands. The first set of commands directs the parallel processing system 112 "GPUB" to launch the kernel "haloBApart1" (whose results are required by the kernel "haloBApart2" that is included in stream 235 "Ahigh") with a device priority of "59." The second set of commands directs the parallel processing system 112 "GPUB" to suspend processing of work components included in the stream "Bhigh" until the kernel "haloABpart1" has finished executing on the parallel processing subsystem 112 "GPUA." And the third set of commands directs the parallel processing system 112 "GPUB" to launch a kernel "haloABpart2" at a device priority of "59." The CUDA stream 235 "Blow" includes commands that direct the parallel processing system 112 "GPUB" to launch a kernel "internalB" at a device priority of "63."

Figure 4:
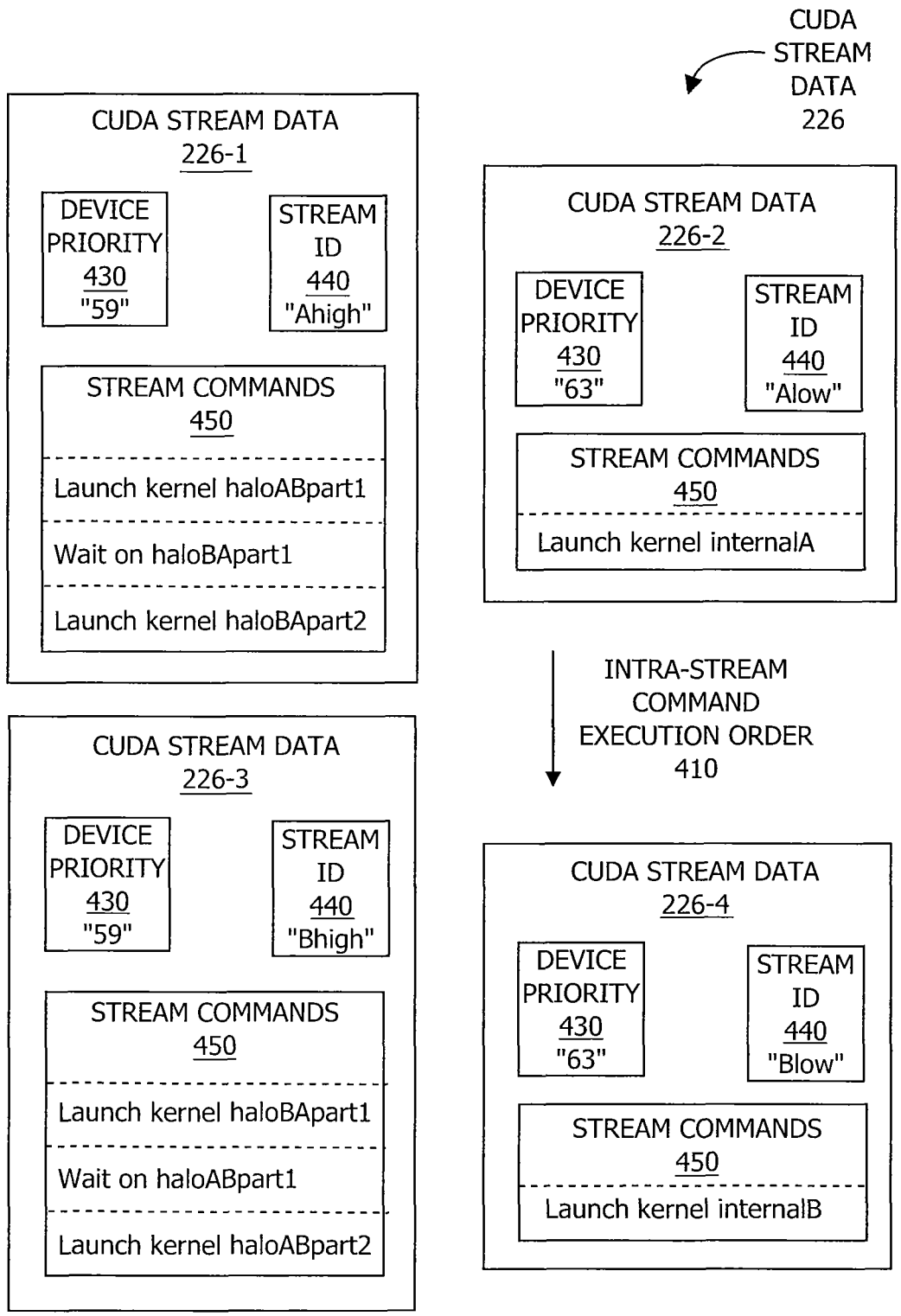
FIG. 4 is a conceptual diagram illustrating exemplary CUDA stream data of FIG. 2 corresponding to the exemplary application CUDA requests of FIG. 3, according to one embodiment of the present invention.

FIG. 4 is a conceptual diagram illustrating exemplary CUDA stream data 226 of FIG. 2 corresponding to the exemplary application CUDA requests 205 of FIG. 3, according to one embodiment of the present invention. As shown, the exemplary CUDA stream data 226 comprises four sets of CUDA stream data, 226-1 through 226-4. Each set of CUDA stream data 226 represents a separate CUDA stream 235 and includes, without limitation, an identifying stream ID 440, a device priority 430 and one or more stream commands 450.

As also shown, within each set of stream commands 450 associated with a particular stream ID 440 and, therefore, a particular CUDA stream 235, the stream commands 450 execute sequentially in an intra-stream command execution order 410. Again, within each CUDA stream 235, the kernels execute in issue-order on the associated parallel processing subsystem 112. Therefore, the intra-stream command execution order 410 within each set of stream commands 450 corresponds to the issue order 310 of the corresponding application CUDA requests 205 of FIG. 3. Again, kernels included in different sets of stream commands 450 (i.e., different CUDA streams 235) may run concurrently and may be interleaved.

Advantageously, as previously disclosed, both the CUDA stack 150 and the parallel processing subsystems 112 "GPUA" and "GPUB" include functionality that enable prioritization of kernels and preemption of currently executing kernels. As previously outlined, the CUDA streams 235 "Ahigh" and "Alow" are configured to run on the parallel processing subsystem 112 "GPUA" and the CUDA streams 236 "Bhigh" and "Blow" are configured to run on the parallel processing subsystem 112 "GPUB." Consequently, two kernels included in two different CUDA streams 235 may run concurrently. In other words, a kernel included in the CUDA streams 235 "Ahigh" or "Alow" may run concurrently with a kernel included in the CUDA stream 235 "Bhigh" or "Blow."

Figure 5:
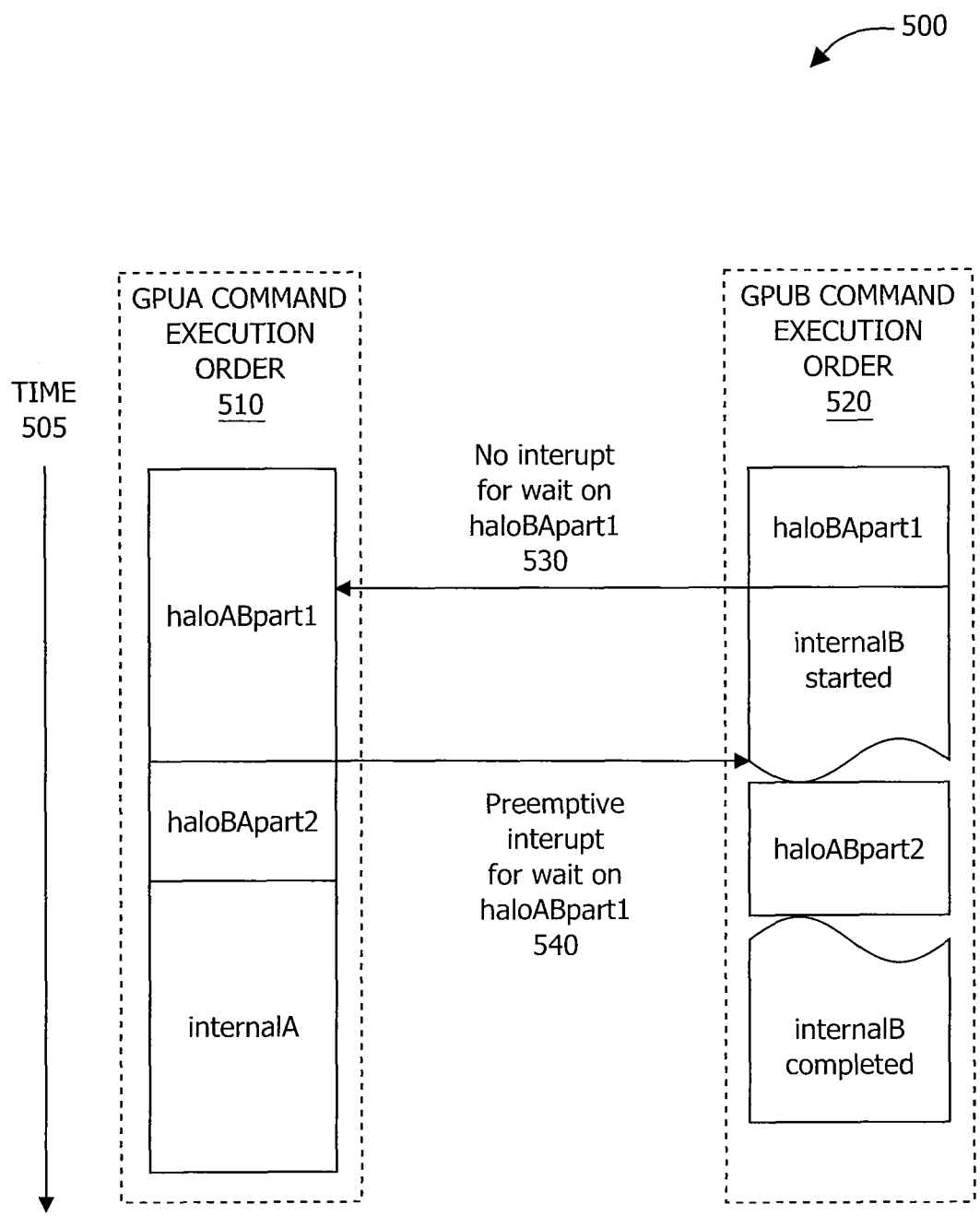
FIG. 5 is a conceptual diagram illustrating execution orders corresponding to the exemplary application CUDA requests of FIG. 3, according to one embodiment of the present invention.

FIG. 5 is a conceptual diagram illustrating execution orders corresponding to the exemplary application CUDA requests 205 of FIG. 5, according to one embodiment of the present invention. GPUA command execution order 510 corresponds to the execution order within the parallel processing subsystem 112 "GPUA." And GPUAB command execution order 520 corresponds to the execution order within the parallel processing subsystem 112 "GPUB." As shown, FIG. 5 is organized sequentially in a time order 505.

As shown, the first kernel "HaloABpart1" included in the CUDA stream 235 "Ahigh" is associated with a higher priority than the first kernel "InternalA" included in the CUDA stream 235 "Alow." Therefore, the kernel "HaloABpart1" is the first command to begin executing on the parallel processing subsystem 112 "GPUA." Concurrently, because the first kernel "HaloBApart1" included in the CUDA stream 235 "Bhigh" is associated with a higher priority than the first kernel "InternalB" included in the CUDA stream 235 "Blow," the kernel "HaloBApart1" is the first command to begin executing on the parallel processing subsystem 112 "GPUB."

The kernel "haloBApart1" included in the CUDA stream 235 "Bhigh" finishes executing before the kernel "haloABpart1" finishes executing. And the next command included in the CUDA stream 235 "Bhigh" instructs parallel processing subsystem 112 "GPUB," to wait until the kernel "haloABpart1" has completed executing before continuing. Consequently, the parallel processing subsystem 112 "GPUB," begins executing the kernel "internalB" included in the CUDA stream 235 "Blow." Concurrently, the parallel processing subsystems 112 "GPUA" and "GPUB" perform synchronizing operations that result in "no interrupt for wait on haloBApart1" 530. In other words, the commands included in the CUDA streams 235 to implement "wait on haloBApart1" within the CUDA stream 235 "Ahigh" have been satisfied and are no longer relevant to the GPUA command execution order 510.

When the kernel "haloABpart1" finishes executing on the parallel processing subsystem 112 "GPUA," the parallel processing subsystems 112 "GPUA" and "GPUB" perform synchronizing operations that result in "a preemptive interrupt for wait on haloABpart1" 540. Because the CUDA stream 235 "Bhigh" is no longer blocked waiting for the kernel "haloABpart1" to complete, the parallel processing subsystem 112 "GPUB" reevaluates the GPUB command execution order 520. The next command included in the CUDA stream 235 "Bhigh" is the launch of the kernel "haloABpart2." The kernel "haloABpart2" is associated with a higher device priority than the currently executing kernel "internal B" (included in the separate CUDA stream 235 "Blow"). Consequently, the parallel processing subsystem 112 "GPUB" interrupts the lower priority kernel "internal B." The parallel processing subsystem 112 "GPUB" then executes the higher priority kernel "haloABpart2" and, subsequently, resumes executing the lower priority kernel "internal B."

Concurrently, when the kernel "haloABpart1" finishes executing on the parallel processing subsystem 112 "GPUA," the parallel processing subsystem 112 "GPUA" evaluates the device priorities of the least recently issued commands included in each of the two CUDA streams "Alow" and "Ahigh." More specifically, the parallel processing subsystem 112 "GPUA," evaluates the kernel "internalA" included in the CUDA stream 235 "Alow" and the kernel "haloBApart2" included in the CUDA stream 235 "Ahigh." Since, the kernel "haloBApart2" is associated with a higher device priority than the kernel "internalA," the parallel processing subsystem 112 "GPUA" executes the kernel "haloBApart2" before the kernel "internalA."

Advantageously, by assigning CUDA priorities to the CUDA streams 235 and, subsequently, strategically launching kernels within the prioritized CUDA streams 235, the software application 112 optimizes resources. More specifically, the software application 112 ensures that the parallel processing subsystems 112 "GPUA" and "GPUB" are continuously executing kernels. And each kernel associated with a high device priority is executed as soon as any associated input dependencies are satisfied. Further, this advanced scheduling ensures that the "haloABpart2" and "haloBApart2" kernels are executed as soon as possible. And, as outlined in FIG. 3, this expedites the execution of other algorithms (not detailed herein) included in the software application 125 that require the results from the "haloABpart2" and the "haloBApart2" kernels as inputs. In contrast, in prior-art approaches to scheduling, the "haloABpart2" and "haloBApart 2" kernels might get blocked waiting for one or more of the "haloABpart1," "haloABpart1," "internalA," and "internalB" kernels to finish executing. Further, in these prior-art approaches, other algorithms included in the software application 125 might get blocked waiting for the "haloABpart2" and "haloBApart2" kernels to finish executing. As illustrated by this example, by exposing the prioritization functionality of the parallel processing subsystem 112, the disclosed techniques may enable application developers to tailor the software application 125 to reduce stalls and blockages. And reducing stalls and blockages may decrease latency, increase throughput, and decrease the execution time of the software application 125.

Figure 6:
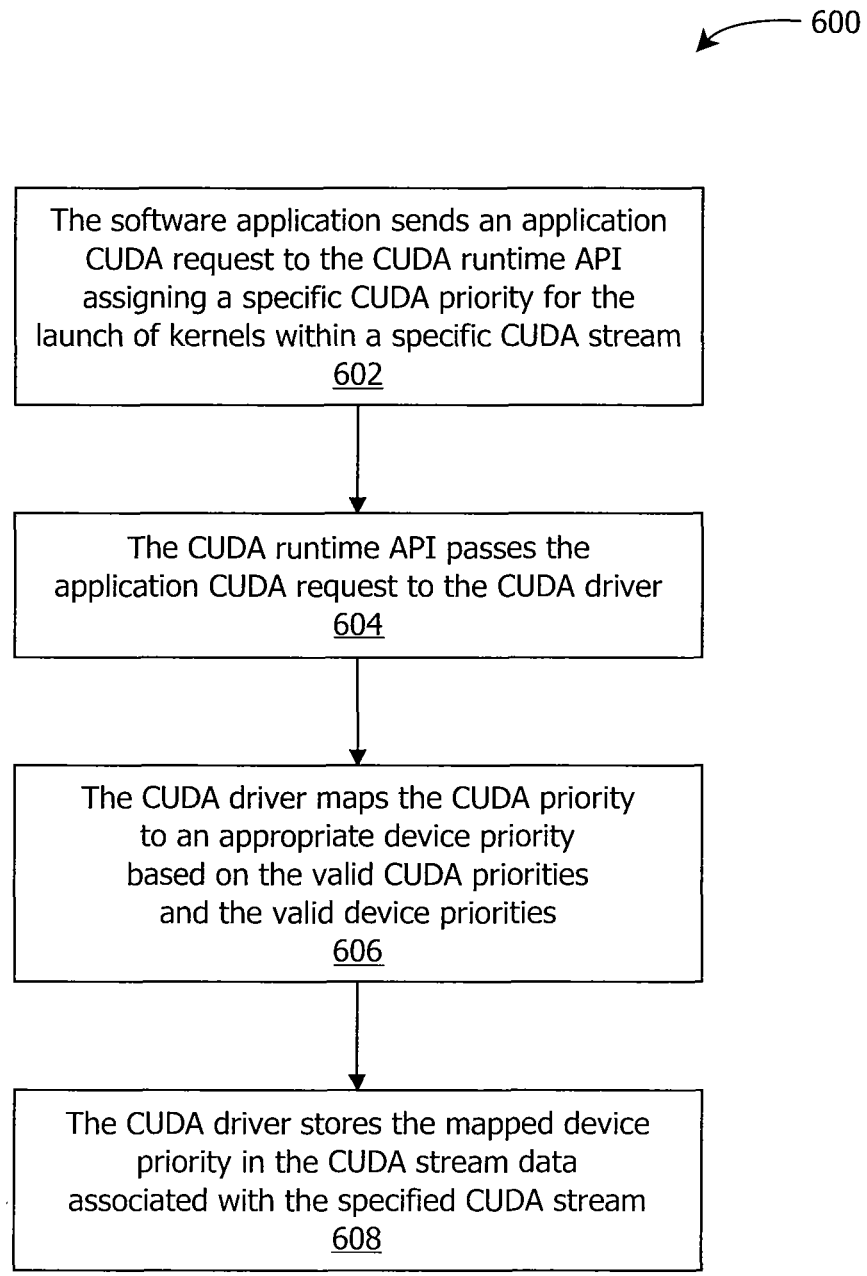
FIG. 6 is a flow diagram of method steps for assigning priorities to different streams of work, according to one embodiment of the present invention.

FIG. 6 is a flow diagram of method steps for assigning priorities to different streams of work, according to one embodiment of the present invention. Although the method steps are described with reference to the systems of FIGS. 1-5, persons skilled in the art will understand that any system configured to implement the method steps, in any order, falls within the scope of the present invention.

As shown, a method 600 begins at step 602, where the software application 125 sends an application CUDA request 205 to the CUDA runtime API 210 assigning a specific CUDA priority for the launch of kernels within a specific CUDA stream 235. At step 604, the CUDA runtime API 210 passes the application CUDA request 205 to the CUDA driver 220. At step 606, the CUDA driver 220 maps the CUDA priority to an appropriate device priority based on the valid CUDA priorities 222 and the valid device priorities 224. The CUDA driver 220 may perform this mapping in any technically feasible manner. Further, as previously disclosed, the CUDA driver 220 may reserve one or more valid device priorities 224 to support other functionality, such as dynamic parallelism. At step 608, the CUDA driver 220 stores the mapped device priority in the CUDA stream data 226 associated with the specified CUDA stream 235. The CUDA stream data 226 may be stored in any available memory resource, such as system memory 104, and may be included in any applicable data structure.

Figure 7:
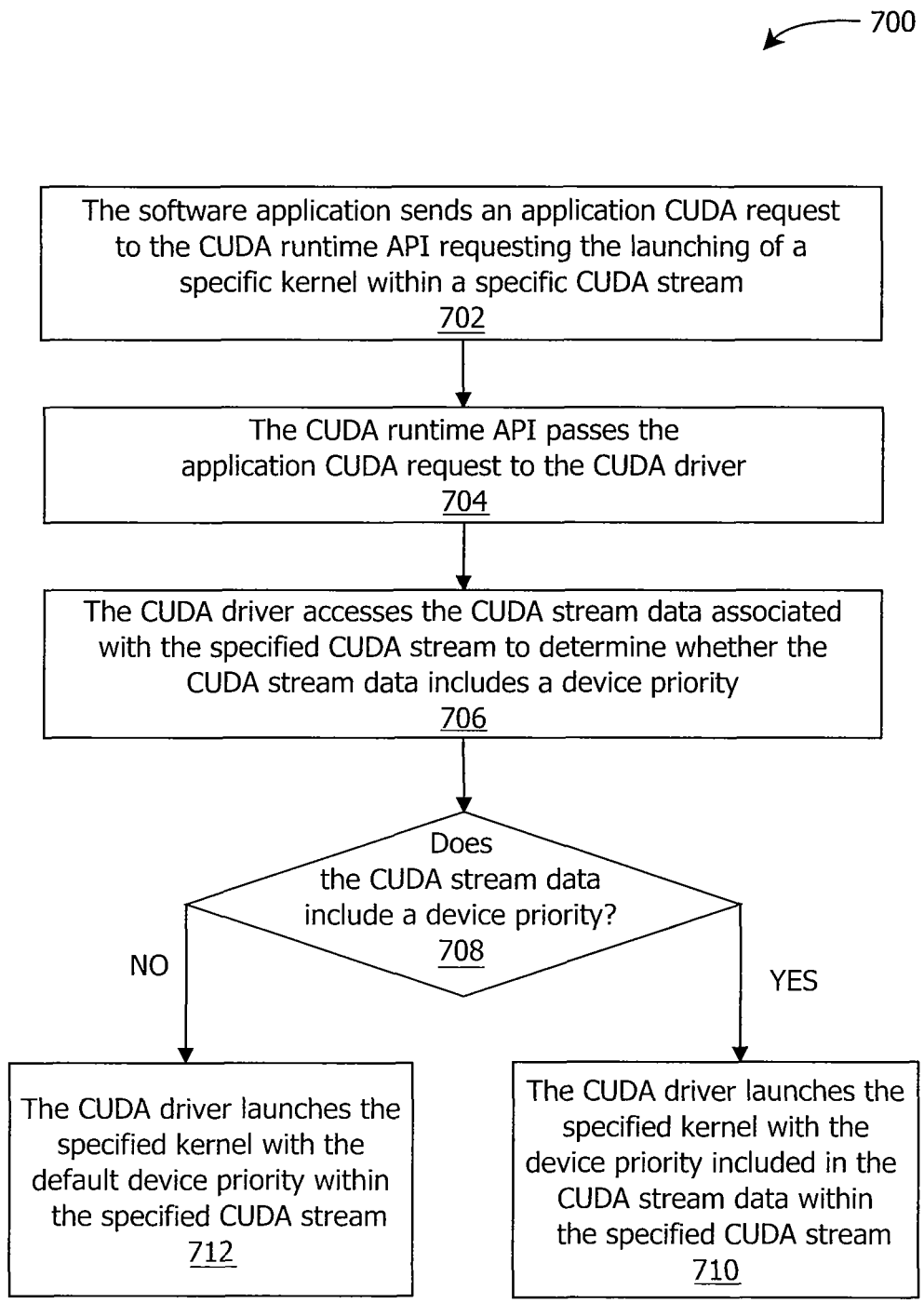
FIG. 7 is a flow diagram of method steps for assigning priorities to different kernels, according to one embodiment of the present invention.

FIG. 7 is a flow diagram of method steps for assigning priorities to different kernels, according to one embodiment of the present invention. Although the method steps are described with reference to the systems of FIGS. 1-5, persons skilled in the art will understand that any system configured to implement the method steps, in any order, falls within the scope of the present invention.

As shown, a method 700 begins at step 702, where the software application 125 sends an application CUDA request 205 to the CUDA runtime API 210 requesting the launch of a specific kernel within a specific CUDA stream 235. At step 704, the CUDA runtime API 210 passes the application CUDA request 205 to the CUDA driver 220. At step 706, the CUDA driver 220 accesses the CUDA stream data 226 associated with the specified CUDA stream 235 to determine whether the CUDA stream data 226 includes a device priority. If, at step 708 the CUDA driver 220 determines that the CUDA stream data 226 includes a device priority, then the method proceeds to step 710. At step 710, the CUDA driver 220 launches the specified kernel with the device priority included in the CUDA stream data 226 within the specified CUDA stream 235, and the method 700 terminates.

If, at step 708, the CUDA driver 220 determines that the CUDA stream data 226 does not include a device priority, then the method 700 proceeds to step 712. At step 712, the CUDA driver 220 launches the specified kernel with a default device priority within the specified CUDA stream 235, and the method 700 terminates. In alternate embodiments, the CUDA driver 220 may launch the specified kernel without a device priority within the specified CUDA stream 235.

It will be appreciated that the system and techniques described in FIGS. 1-7 are illustrative and that variations and modifications are possible. For example, in alternate embodiments, the CUDA software stack 150 (including the CUDA runtime API 210 and the CUDA driver 220), CUDA programming model, and CUDA language may be replaced with may be replaced with any set of software programs that expose and manage parallel processing subsystem functionality (e.g., OpenCL). Further the CUDA streams 235 may be replaced with any generalized or specialized streams, and the kernels included in the CUDA streams 235 or any other streams may be replaced with any computational operation that may be launched on the parallel processing subsystem 112

In sum, a CUDA runtime API exposes advanced parallel processing subsystem prioritization capabilities (e.g., scheduling kernels by priority and preempting currently executing lower priority kernels to launch higher priority kernels) to application developers. More specifically, the CUDA runtime API defines a set of valid CUDA priorities and provides calls that enable the software application to request a specific CUDA priority for the launch of kernels within a specific CUDA stream. The CUDA driver maps the CUDA priorities to the valid device priorities (i.e., the priorities supported by the parallel processing subsystem). Subsequently, the CUDA driver includes the device priority associated with a particular CUDA stream when submitting kernels to the parallel processing system for processing within the particular CUDA stream.

Because the CUDA driver maps the valid CUDA priorities to the valid device priorities, the CUDA driver supports the same software application on parallel processing subsystems that include a variety of prioritization functionality. For example, if the software application does not specify CUDA priorities, then the CUDA driver launches each kernel with the default device priority. And if the software application specifies CUDA priorities, but the parallel processing subsystem does not support multiple priorities, then the CUDA driver launches each kernel without a priority.

While the foregoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons of ordinary skill in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

Therefore, the scope of the present invention is determined by the claims that follow.

What is claimed is:

1. A method for prioritizing computational work components included in a software application for execution within a parallel processing subsystem, the method comprising:
   receiving a current request from the software application to launch a computational work component within a stream;
   receiving a request from the software application to associate the stream with a desired execution priority included in a set of valid desired execution priorities;
   mapping the desired execution priority to the device priority based on the set of valid desired execution priorities and a set of available device priorities supported by the parallel processing subsystem, wherein the set of available device priorities excludes one or more reserved device priorities supported by the parallel processing subsystem; and
   submitting the computational work component to the parallel processing subsystem for execution within the stream at the device priority.

2. The method of claim 1, wherein the computational work component comprises a function that is executable via a plurality of parallel threads.

3. The method of claim 1, wherein identifying the device priority comprises accessing a memory resource to read the device priority associated with the stream.

4. The method of claim 3, further comprising storing the device priority in the memory resource associated with the stream.

5. The method of claim 1, wherein the one or more reserved device priorities include one or more child device priorities used by the parallel processing system to support dynamic parallelism.

6. The method of claim 1, wherein the number of valid desired execution priorities is less than the number of available device priorities.

7. The method of claim 1, wherein the device priority comprises a default device priority associated with the parallel processing subsystem.

8. A non-transitory computer-readable storage medium including instructions that, when executed by a processing unit, cause the processing unit to prioritize computational work components included in a software application for execution within a parallel processing subsystem by performing the steps of:
receiving a current request from the software application to launch a computational work component within a stream;
receiving a request from the software application to associate the stream with a desired execution priority included in a set of valid desired execution priorities;
mapping the desired execution priority to the device priority based on the set of valid desired execution priorities and a set of available device priorities supported by the parallel processing subsystem, wherein the set of available device priorities excludes one or more reserved device priorities supported by the parallel processing subsystem; and
submitting the computational work component to the parallel processing subsystem for execution within the stream at the device priority.

9. The computer-readable storage medium of claim 8, wherein the computational work component comprises a function that is executable via a plurality of parallel threads.

10. The computer-readable storage medium of claim 8, wherein identifying the device priority comprises accessing a memory resource to read the device priority associated with the stream.

11. The computer-readable storage medium of claim 10, further comprising storing the device priority in the memory resource associated with the stream.

12. The computer-readable storage medium of claim 8, wherein the one or more reserved device priorities include one or more child device priorities used by the parallel processing system to support dynamic parallelism.

13. The non-transitory computer-readable storage medium of claim 12, wherein, during execution within the stream, the computational work component launches a child computational work component having a child device priority included in the one or more reserved priorities, and the child device priority assigned to the child computational work component is a higher priority than the device priority assigned to the computational work component.

14. The non-transitory computer-readable storage medium of claim 13, wherein the computational work component launches the child computational work component without involvement from the processing unit that submitted the computational work component for execution by the parallel processing subsystem.

15. The computer-readable storage medium of claim 8, wherein the number of valid desired execution priorities is less than the number of available device priorities.

16. The computer-readable storage medium of claim 8, wherein the device priority comprises a default device priority associated with the parallel processing subsystem.

17. A system configured to prioritize computational work components included in a software application for execution within a parallel processing subsystem, the system comprising:
a memory that includes a driver program; and
a processor coupled to the memory, wherein, when executing the driver program, the processor is configured to:
receive a current request from the software application to launch a computational work component within a stream;
receive a request from the software application to associate the stream with a desired execution priority included in a set of valid desired execution priorities;
map the desired execution priority to the device priority based on the set of valid desired execution priorities and a set of available device priorities supported by the parallel processing subsystem, wherein the set of available device priorities excludes one or more reserved device priorities supported by the parallel processing subsystem; and
submit the computational work component to the parallel processing subsystem for execution within the stream at the device priority.

18. The system of claim 17, wherein the computational work component comprises a function that is executable via a plurality of parallel threads.

19. The system of claim 17, wherein identifying the device priority comprises accessing a memory resource to read the device priority associated with the stream.

20. The system of claim 19, wherein the processor is further configured to store the device priority in the memory resource associated with the stream.

* * * * *